United States Patent
Hung et al.

(10) Patent No.: US 10,429,248 B2
(45) Date of Patent: Oct. 1, 2019

(54) TEMPERATURE SENSOR

(71) Applicant: THE BOEING COMPANY, Chicago, IL (US)

(72) Inventors: Kuohsing E. Hung, Chicago, IL (US); Charles S. Meis, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 81 days.

(21) Appl. No.: 15/456,309

(22) Filed: Mar. 10, 2017

(65) Prior Publication Data
US 2018/0259398 A1 Sep. 13, 2018

(51) Int. Cl.
*G01K 1/14* (2006.01)
*G01K 7/04* (2006.01)
*G01K 7/02* (2006.01)

(52) U.S. Cl.
CPC ............ *G01K 1/14* (2013.01); *G01K 1/146* (2013.01); *G01K 7/04* (2013.01); *G01K 7/02* (2013.01)

(58) Field of Classification Search
CPC .... G01J 5/12; G01K 1/14; G01K 7/02; G01K 1/143; G01K 1/08; G01K 5/70; G01K 1/146; G01K 7/025
See application file for complete search history.

(56) References Cited

U.S. PATENT DOCUMENTS

| | | | | |
|---|---|---|---|---|
| 2,838,935 A | * | 6/1958 | Di Cecio | F16P 7/00 338/23 |
| 2,875,614 A | * | 3/1959 | Dobrin | G01K 1/08 374/203 |
| 3,311,864 A | * | 3/1967 | Walker | G01K 1/146 374/E1.02 |
| 3,452,706 A | * | 7/1969 | Vogt | F16T 1/48 116/102 |
| 3,468,723 A | | 9/1969 | Lambert | |
| 3,501,957 A | * | 3/1970 | Jones, Jr. | G01K 7/021 136/236.1 |
| 3,751,305 A | | 8/1973 | Huebscher | |
| 4,826,540 A | | 5/1989 | Mele | |
| 5,297,716 A | * | 3/1994 | Smith | B23K 3/033 136/221 |
| 5,527,111 A | * | 6/1996 | Lysen | G01K 1/143 136/221 |
| 5,674,009 A | * | 10/1997 | Stark | G01K 1/08 136/230 |
| 5,955,684 A | * | 9/1999 | Gravel | G01F 23/268 73/866.5 |

(Continued)

FOREIGN PATENT DOCUMENTS

CN 204621601 U * 9/2015

*Primary Examiner* — Gail Kaplan Verbitsky
(74) *Attorney, Agent, or Firm* — Toler Law Group, PC

(57) ABSTRACT

Disclosed is a temperature sensor for measuring a temperature of a reference material. The temperature sensor includes a thermocouple, spring, and spring housing. The thermocouple is configured to measure the temperature of the reference material. The spring is operably coupled to the thermocouple and the spring housing is configured to accommodate the spring and thermocouple within the spring housing. Additionally, the spring housing is configured to attach to the reference material and the spring applies a force on the thermocouple in a direction towards the reference material.

20 Claims, 8 Drawing Sheets

(56) References Cited

U.S. PATENT DOCUMENTS

| | | | | |
|---|---|---|---|---|
| 6,193,414 | B1* | 2/2001 | Balzano | G01K 1/14 |
| | | | | 374/208 |
| 8,814,428 | B2* | 8/2014 | Chancy | G01B 5/0014 |
| | | | | 136/230 |
| 10,018,212 | B1* | 7/2018 | Strange | F16B 13/063 |
| 2006/0275933 | A1* | 12/2006 | Du Bois | G01K 1/143 |
| | | | | 438/14 |
| 2007/0217480 | A1* | 9/2007 | Lai | G01K 1/143 |
| | | | | 374/208 |
| 2011/0084794 | A1 | 4/2011 | Zuchek et al. | |
| 2013/0163637 | A1* | 6/2013 | Parsons | G01K 1/14 |
| | | | | 374/179 |
| 2013/0259090 | A1* | 10/2013 | Schlipf | G01K 1/14 |
| | | | | 374/179 |
| 2014/0105248 | A1* | 4/2014 | Daily | G01K 1/143 |
| | | | | 374/179 |
| 2016/0169259 | A1* | 6/2016 | Burleson | F16B 5/0642 |
| | | | | 411/510 |

\* cited by examiner

TEMPERATURE SENSOR

BACKGROUND

1. Field

The present disclosure relates generally to temperature sensors and, more particularly, to temperature sensors utilizing a thermocouple.

2. Related Art

At present, there are numerous needs to test certain types or materials or devices with temperature sensors that are temperature measurement devices. This testing may be conducted in a laboratory or on moving vehicles such as, for example, an aircraft in a flight test environment. In the case of testing aircraft heating systems, the purpose of the temperature sensor is to make accurate temperature measurements such as, for example, the surface temperature of a structural member of the aircraft, such that the thermal performance of the aircraft may be determined.

In general, many of these temperature sensors utilize thermocouple devices, where a thermocouple device (generally known simply as a "thermocouple") is an electrical device for making temperature measurements. Generally, a thermocouple is an electrical device having two dissimilar conductors forming electrical junctions at differing temperatures. In an example of operation, a thermocouple produces a temperature-dependent voltage as a result of the thermoelectric effect and this temperature-dependent voltage may be interpreted to measure temperature. Similarly, the thermocouple may also be viewed as producing an electrical current that is proportional to the temperature change. Either way, the changes in voltage or current may be interpreted as a measure of temperature. Usually, a thermocouple is, or is part of, a temperature sensor. As such, thermocouples are widely utilized in laboratory testing and on flight testing of aircraft as temperature sensors that convert a temperature gradient being measured into electrical signals that are indicative of the temperature being measured.

Unfortunately, a problem associated with utilizing thermocouples in certain types of testing scenarios is that there are problems associated with the several known procedures for installing thermocouples on material and surfaces that need to be temperature tested. The problems result in issues with the integrity of the application, thermocouple, and the accuracy of the measurement.

As an example, a typical thermocouple installation process involve staking the thermocouple onto a reference surface of a material and covering the thermocouple with adhesive material such as, for example, an epoxy or high temperature room temperature vulcanization ("RTV") silicon or the equivalent. Unfortunately, this installation approach does not work well in a vibrating environment such as, for example, an aircraft in flight, or when the thermocouple (including thermocouple wire) is subject to the force of air flow such, for example, as bleed air flow inside an engine inlet.

Commonly known issues with this type of installation include complete detachment of the thermocouple from the reference surface due to deteriorating adhesive material over periods of time, high vibration, or partial detachment of the thermocouple from the surface but with the adhesive material still intact. Any of these issues will result in incorrect temperature readings and the last example issue is of high concern because it is difficult to identify because the thermocouple may detach from the reference surface while still covered by the adhesive material.

Moreover, in some situations, the reference material to be temperature tested may be exposed to air or other fluid flow on one or both sides of the material, and because of the environmental conditions, other safety, or operational considerations it may not be possible to install thermocouples on the side of the reference material where temperature measurements are desired. As such, it becomes even more important to measure the temperatures accurately at the locations on the reference material where thermocouples are necessarily installed. Therefore, there is a need for temperature sensor and method for measuring the temperature on reference materials that overcome the earlier described problems.

SUMMARY

Disclosed is a temperature sensor for measuring a temperature of a reference material. The temperature sensor includes a thermocouple, spring, and spring housing. The thermocouple is configured to measure the temperature of the reference material. The spring is operably coupled to the thermocouple and the spring housing is configured to accommodate the spring and thermocouple within the spring housing. Additionally, the spring housing is configured to attach to the reference material and the spring applies a force on the thermocouple in a direction towards the reference material.

The temperature sensor is installed on the reference material utilizing a method that includes: attaching the spring housing on the reference material; operably coupling the spring to the thermocouple; inserting the operably coupled spring and thermocouple into the spring housing; and retaining the operably coupled spring and thermocouple within the spring housing such that the spring applies the force on the thermocouple in the direction towards the reference material.

Once installed, the temperature sensor utilizes a method for measuring the temperature of a reference material. The method includes first applying a force with a spring on the thermocouple within the spring housing such that the thermocouple is forced against a surface of the reference material within the spring housing. The method then also includes receiving a first voltage signal from a first wire within the thermocouple and receiving a second voltage signal from a second wire within the thermocouple. The method moreover includes determining the temperature of the reference material utilizing the first voltage and second voltage.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a temperature sensor for measuring a temperature of a reference material. The temperature sensor includes a thermocouple, spring, and spring housing. The thermocouple is configured to measure the temperature of the reference material. The spring is operably coupled to the thermocouple and the spring housing is configured to accommodate the spring and thermocouple within the spring housing. Additionally, the spring housing is configured to attach to the reference material and the spring applies a force on the thermocouple in a direction towards the reference material.

The temperature sensor is installed on the reference material utilizing a method that includes: attaching the spring housing on the reference material; operably coupling the spring to the thermocouple; inserting the operably coupled spring and thermocouple into the spring housing; and retaining the operably coupled spring and thermocouple within the spring housing such that the spring applies the force on the thermocouple in the direction towards the reference material.

Once installed, the temperature sensor utilizes a method for measuring the temperature of a reference material. The method includes first applying a force with a spring on the thermocouple within the spring housing such that the thermocouple is forced against a surface of the reference material within the spring housing. The method then also includes receiving a first voltage signal from a first wire within the thermocouple and receiving a second voltage signal from a second wire within the thermocouple. The method moreover includes determining the temperature of the reference material utilizing the first voltage and second voltage.

Figure 1:
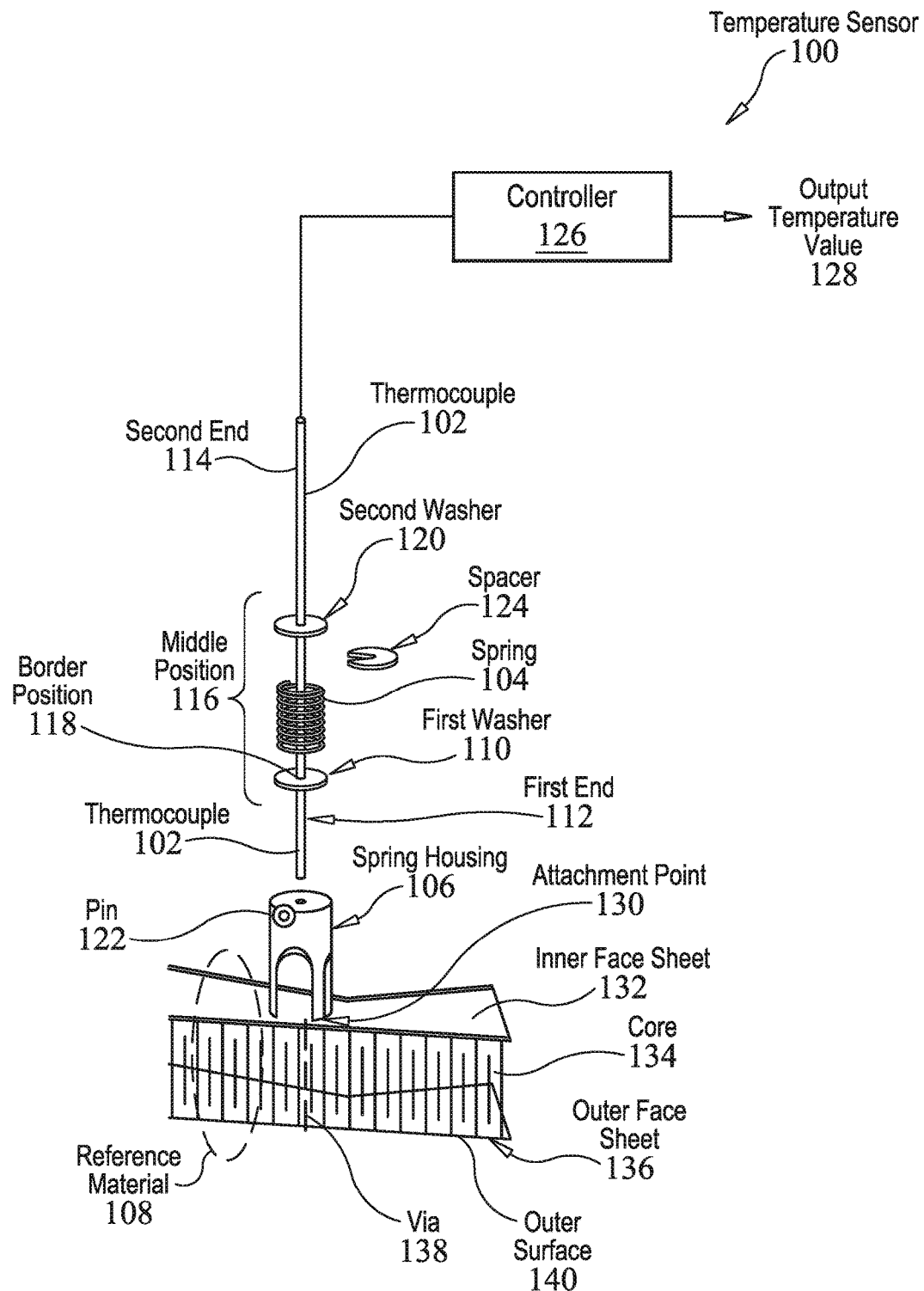
FIG. 1 is an exploded assembly view of an example of an implementation of a temperature sensor in accordance with the present disclosure.

More specifically, in FIG. 1, an exploded assembly view of an example of an implementation of the temperature sensor 100 is shown in accordance with the present disclosure. The temperature sensor 100 includes a thermocouple 102, spring 104, and spring housing 106. The spring 104 is operably coupled to the thermocouple 102 and the spring housing 106 is configured to accommodate the spring 104 and thermocouple 102 within the spring housing 106. Additionally, the spring housing 106 is configured to attach to a reference material 108 and the spring 104 applies a force on the thermocouple 102 in a direction towards the reference material 108.

In this example, the temperature sensor 100 may also include a first washer 110. The thermocouple 102 may include a first end 112, a second end 114, and a middle portion 116 between the first end 112 and the second end 114. As an example, the thermocouple 102 may be coupled to the first washer 110 at a border position 118 of the first end 112 and the middle portion 116 of the thermocouple 102. The spring 104 is coupled with the middle portion 116 of the thermocouple 102 and the spring 104 biases (i.e., applies a force on) the first washer 110 in the direction towards the reference material 108 that may be approximately along a surface normal of the inner face sheet 132, core 134, or outer face sheet 136. It is appreciated by those of ordinary skill in the art that the force on the first washer 110 will be approximately the same as the force applied on the thermocouple 102.

The temperature sensor 100 may also include a second washer 120 and a pin 122. In this example, the thermocouple 102 is coupled to the spring 104, at the middle portion 116 of the thermocouple 102, adjacent to the first washer 110 at the border position 118 of the first end 112) and the middle portion 116 of the thermocouple 102, and the second washer 120 at the middle portion 116 of the thermocouple 102, such that the spring 104 is coupled to the thermocouple 102 between the first washer 110 and the second washer 120. The pin 122 is operatively attached to the spring housing 106 and the pin 122 is configured to retain the second washer 120 within the spring housing 106. In this example, the spring housing 106 may include one or more pin attachments (not shown) that are configured to engage and retain the pin 122. It is appreciated by those of ordinary skill in the art that the spring housing 106 may include a plurality of pin attachments for engaging a plurality of pins (that includes pin 122) to hold the second washer 120 within the spring housing 106.

The temperature sensor 100 may also include a spacer 124, where in this example, the spacer 124 may be adjacent to both the spring 104 and the second washer 120 within the spring housing 106 along the middle portion 116 of the thermocouple 102. Moreover, the temperature sensor 100 may include, or be in signal communication with, a controller 126. The controller 126 is in signal communication with the thermocouple 102 and is a device, component, circuit, or module, or equivalent that is enabled to receive electrical signals (such as voltages or currents) from the thermocouple 102 and configured to produce an output temperature value 128 corresponding to the received electrical signals.

In this example, the spring housing 106 is shown attached to the reference material 108 at one or more attachment points 130 along the spring housing an inner face sheet 132 of the reference material 108. The reference material 108 may any type of material that needs to be measured for temperature. The reference material 108 may have a single layer of homogeneous material or the reference material 108 may have a plurality of material layers of the homogeneous or non-homogeneous materials. Moreover, the reference material 108 may include structural layers. As an example, the reference material 108 may include the inner face sheet 132, a core 134, and an outer face sheet 136. In this example, the core 134 may include inner surfaces within the reference material 108 that may have, for example, a honeycomb structure type of material. Moreover, the inner face sheet 132 is an outer surface of the reference material 108 to which the spring housing 106 is attached to. Furthermore, and the spring 104 applies a force on the thermocouple 102 in a direction towards the reference material 108 that may be approximately along the surface normal to the inner face sheet 132, core 134, or outer face sheet 136.

In an example of installation, the reference material 108 may be bored with a drill to form a via 138 within the reference material 108 that may extend optionally only into the inner face sheet 132, through the inner face sheet 132 and into the core 134, through both the inner face sheet 132 and core 134 into the outer face sheet 136, or through the inner face sheet 132, the core 134, the outer face sheet 136 onto an outer surface 140 of the outer face sheet 136. In this example, when the temperature sensor 100 is attached to the reference material 108, the first end 112 of the thermocouple 102 is staked (i.e., inserted into the via 138) into the reference material 108 and the spring housing 106 is attached to the inner face sheet 132 of the reference material through the one or more attachment points 130. The one or more attachment points 130 may be attached to the inner face sheet 132 utilizing attaching means that include, for example, adhesive bonding, soldering, welding, rivets, screws, latching, crimping, notching, etc.

Figure 2:
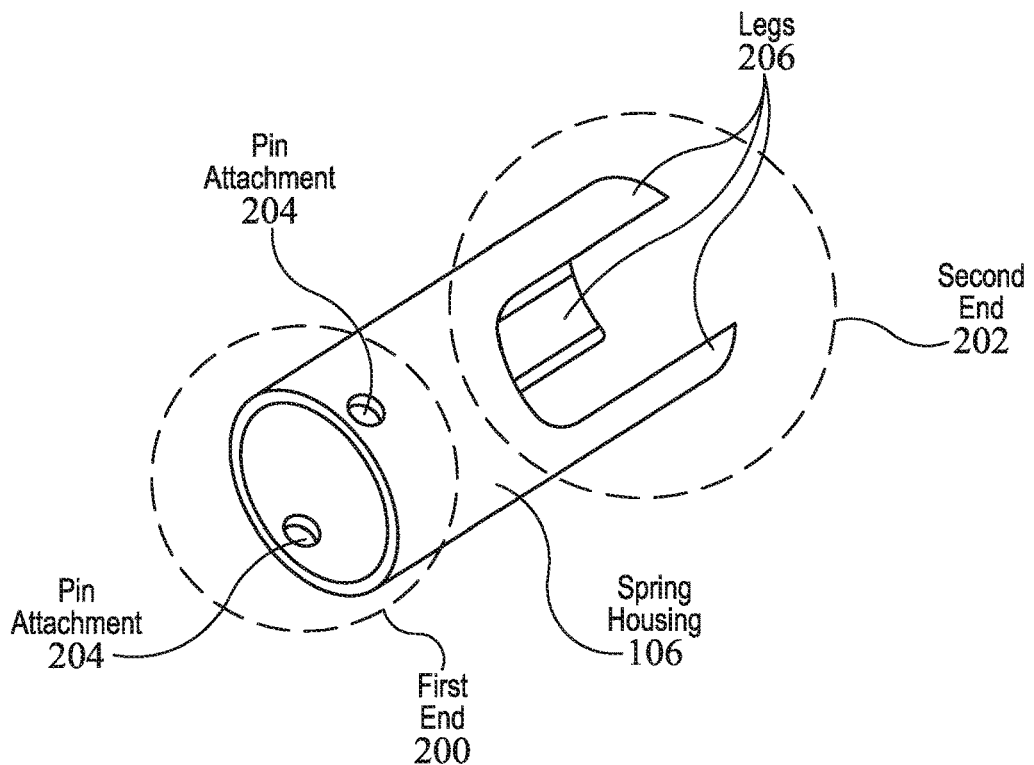
FIG. 2 is a perspective view of an example of an implementation of a spring housing, shown in FIG. 1, in accordance with the present disclosure.

Turning to FIG. 2, a perspective side-view of an example of an implementation of the spring housing 106 is shown in accordance with the present disclosure. The spring housing 106 may be constructed of metal or temperature and vibration resistant non-metallic material such as, for example, ceramic, plastic, or epoxy resin materials. The spring housing 106 may include a first end 200 and second end 202 along the length of the spring housing 106. In this example, the first end 200 may include one or more pin attachments 204 and the second end 202 may include one or more legs 206. As an example, the one or more pin attachment 204 may be pass-through holes configured to receive one or more pins 122 to hold down the second washer 120 so as to keep the spring 104 and first washer 110 within the spring housing 106. The one or more legs 206 are the points along the second end 202 of the spring housing 106 that attach the second end 202 of the spring housing 106 to the inner face sheet 132 along the one or more attachment points 130.

Figure 3:
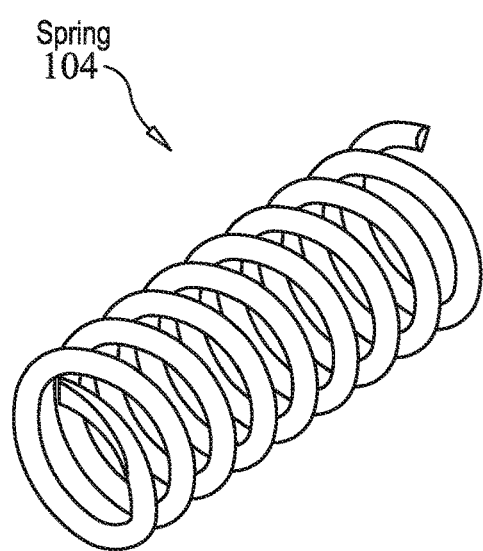
FIG. 3 is a perspective view of an example of an implementation of a spring, shown in FIG. 1, in accordance with the present disclosure.

In FIG. 3, a perspective side-view of an example of an implementation of the spring 104 is shown in accordance with the present disclosure. Generally, the spring 104 may be a helical (i.e., coil) type of spring where if the spring 104 is compressed or stretched from its resting position, the spring 104 exerts an opposing force approximately proportional to its change in length. In this example, the spring 104 may be constructed of a variety of elastic materials that include metal such as spring steel (i.e., low-alloy, medium-carbon steel or high-carbon steel with a high yield strength) and non-ferrous metals such as, for example, phosphor bronze, titanium, beryllium copper, etc. Temperature and vibrational resistant plastics and ceramics may also be utilized.

Figure 4:
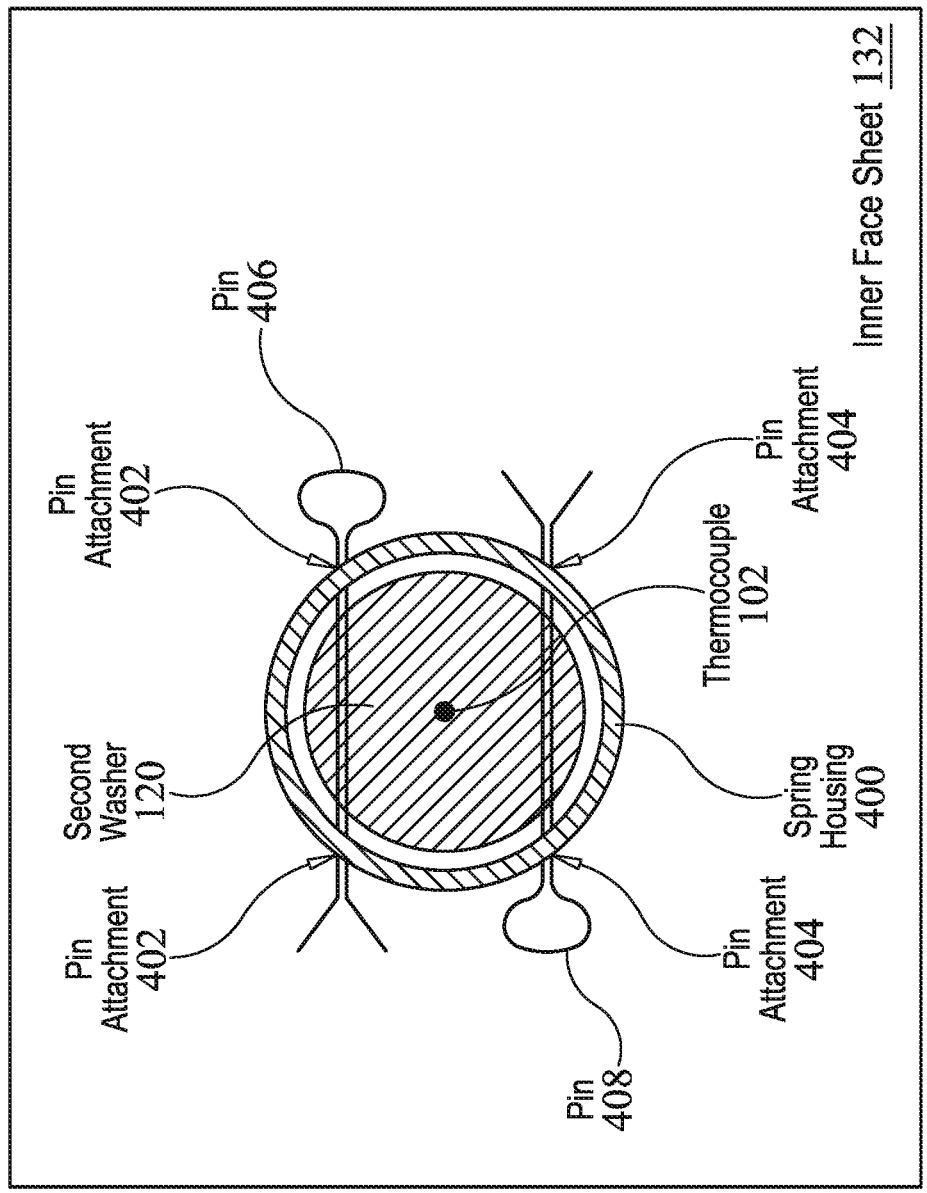
FIG. 4 is a top-view of an example of an implementation of the spring housing, shown in FIGS. 1 and 2, in accordance with the present disclosure.

In FIG. 4, a top-view of an example of an implementation of the spring housing 400 is shown in accordance with the present disclosure. In this example, the spring housing 400 is shown attached to the inner face sheet 132 but unlike the example shown FIG. 2, the spring housing 400 shown in this example includes two pairs of pin attachments 402 and 404. The purpose for this is to allow for two pins 406 and 408 to be attached to the spring housing to hold the second washer 120 in place within the spring housing 400. Specifically, the first pin 406 is attached to the spring housing 400 through pin attachments 402 and the second pin 408 is attached to the spring housing 400 through pin attachments 404. In this example the pin attachments 402 and 404 and pins 406 and 408 may be located along the spring housing 400 at positions that best retain the second washer 120 within the spring housing 400 that minimizes any stress on the thermocouple 102 and best produces a force on the thermocouple 102 in the direction of the inner face sheet 132.

Figure 5:
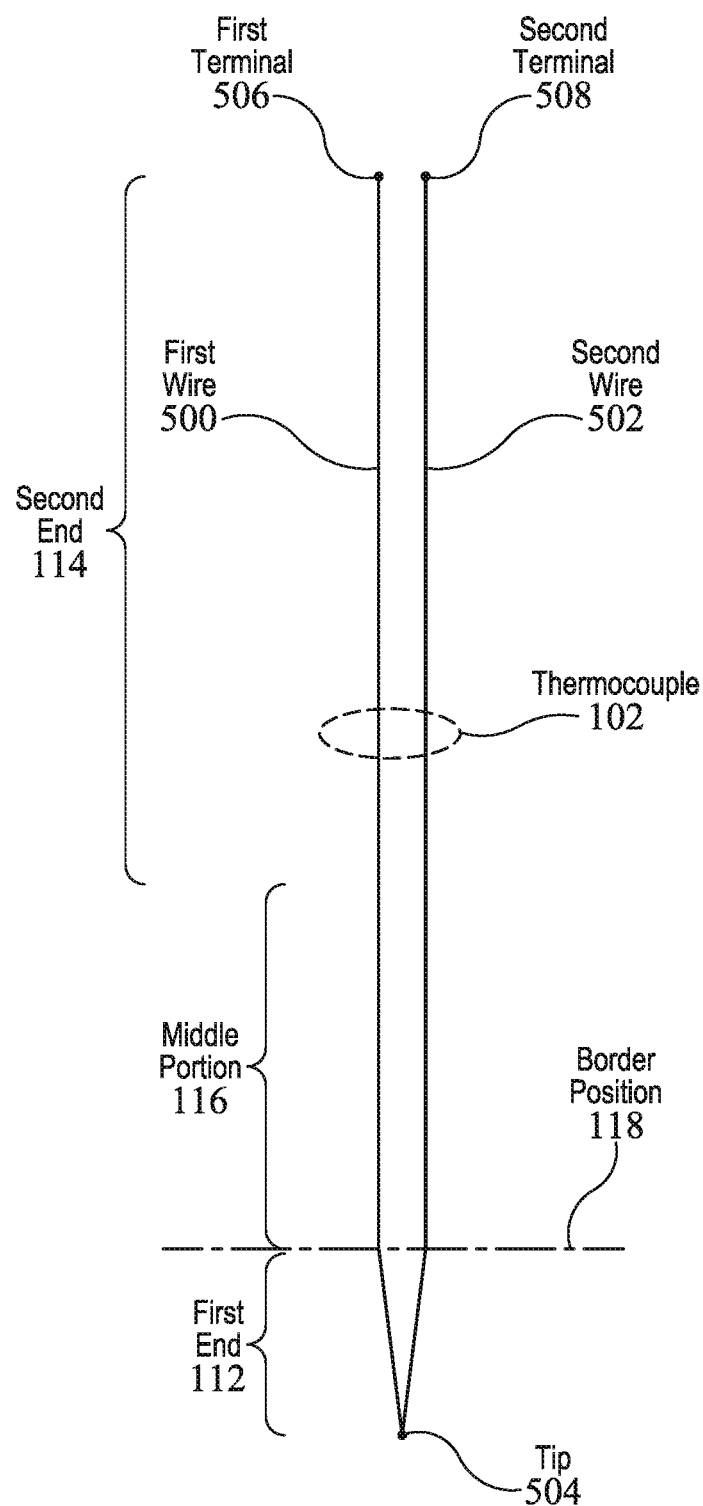
FIG. 5 is a side-view of an example of an implementation of a thermocouple, shown in FIG. 1, in accordance with the present disclosure.

Turning to FIG. 5, a side-view of an example of an implementation of the thermocouple 102 is shown in accordance with the present disclosure. In this example, the thermocouple 102 includes a first wire 500 composed of a first metal and a second wire 502 composed of a different metal than the first metal. The first wire 500 and second wire 502 are in signal communication at a tip 504 of the thermocouple 102. For the purposes of illustration, the thermocouple 102 is shown having the border position 118 between the first end 112 of the thermocouple 102 and the middle portion 116 of the thermocouple 102, as shown in FIG. 1, which corresponds to the position of the first washer 110 along the thermocouple 102. Similarly, the second end 114 of the thermocouple 102 extends from the middle portion 116 of the thermocouple 102 to a first terminal 506 and second terminal 508 at the end of the thermocouple 102. In general, the first terminal 506 and second terminal 508 are in signal communication with the controller 126.

It is appreciated by those skilled in the art that the circuits, components, modules, and/or devices of, or associated with, the thermocouple 102 and controller 126 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 6B:
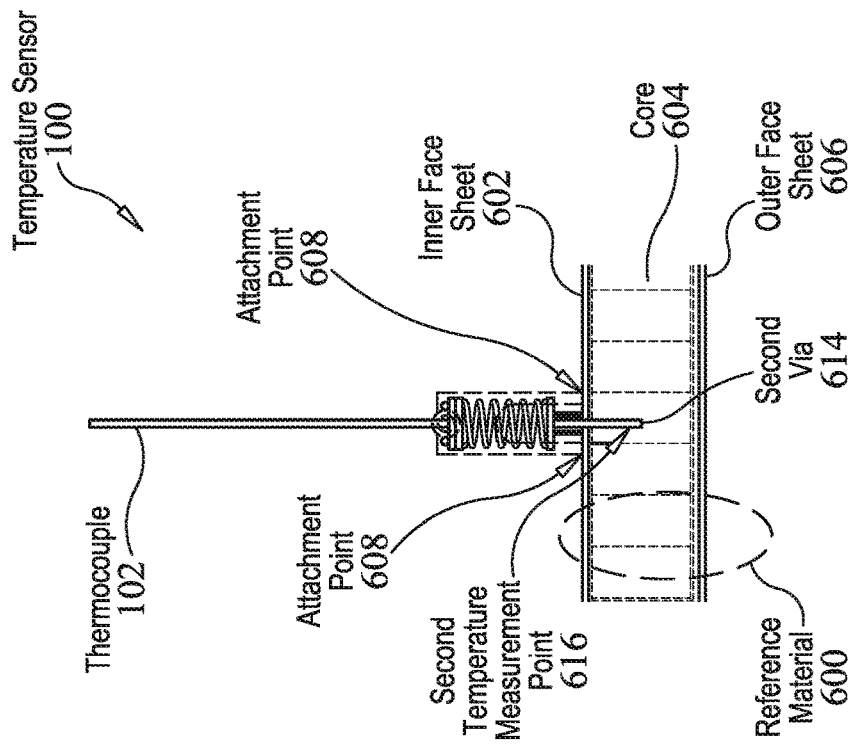
FIG. 6B is a side-view of an example of another implementation of the temperature sensor, shown in FIGS. 1 and 6A, on a reference material in accordance with the present disclosure.
Figure 6A:
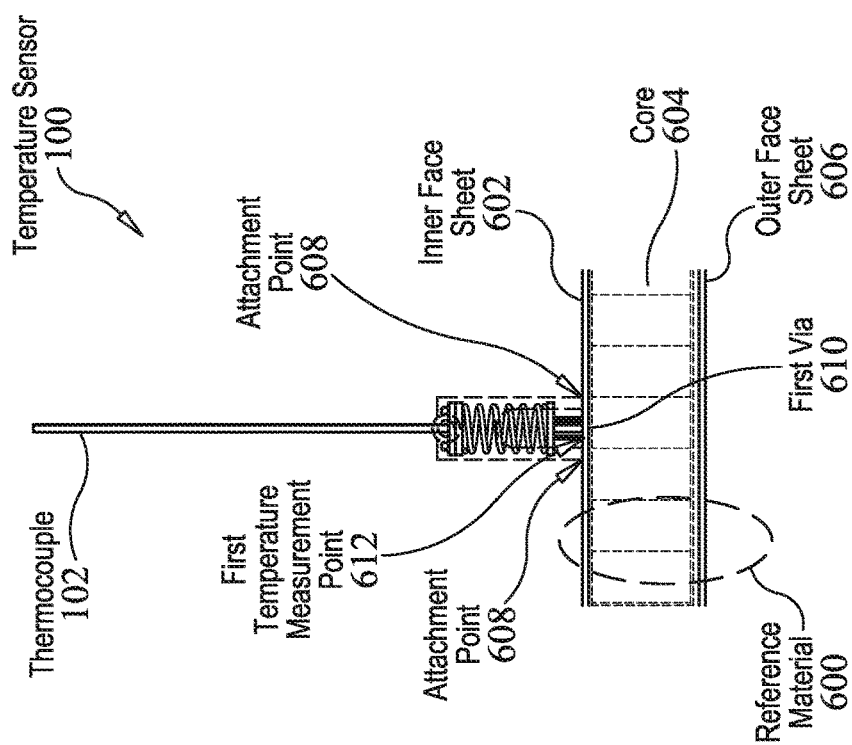
FIG. 6A is a side-view of an example of an implementation of the temperature sensor, shown in FIG. 1, on a reference material in accordance with the present disclosure.

Turning to FIG. 6A, a side-view of an example of an implementation of the temperature sensor 100 on a reference material 600 is shown in accordance with the present disclosure. In this example, the reference material 600 includes an inner face sheet 602, a core 604, and an outer face sheet 606. In general, the inner face sheet 602 may be a back sheet, the inner core 604 may be a honeycomb core, and the outer face sheet 606 may be a face sheet. The temperature sensor 100 is attached to the inner face sheet 602 through the attachment points 608 as described earlier. In this example, the length of the first end 112 of the thermocouple 102 is placed against the surface of the inner face sheet 602 or within a small first via 610 within the inner face sheet 602. In this configuration, the temperature sensor 100 is configured to measure the temperature of the inner face sheet 602 at a first temperature measurement point 612 at the tip of the thermocouple 102 and the inner face sheet 602.

In FIG. 6B, a side-view of an example of another implementation of the temperature sensor 100 on the reference material 600 is in accordance with the present disclosure. In this example, the reference material 600 includes a deeper second via 614 that extends through the inner face sheet 602 into the core 604. The temperature sensor 100 is attached to the inner face sheet 602 in the same fashion as in the example shown in FIG. 6A, however, in this example, the length of the first end 112 of the thermocouple 102 is longer than the example shown in FIG. 6A and the first end 112 extends through the inner face sheet 602 and into the core 604 via the second via 614. In this configuration, the temperature sensor 100 is configured to measure the temperature of the core 604 at a second temperature measurement point 616 at the tip of the thermocouple 102 and inner surface of the core 604 (which may be a honeycomb structure).

Figure 6C:
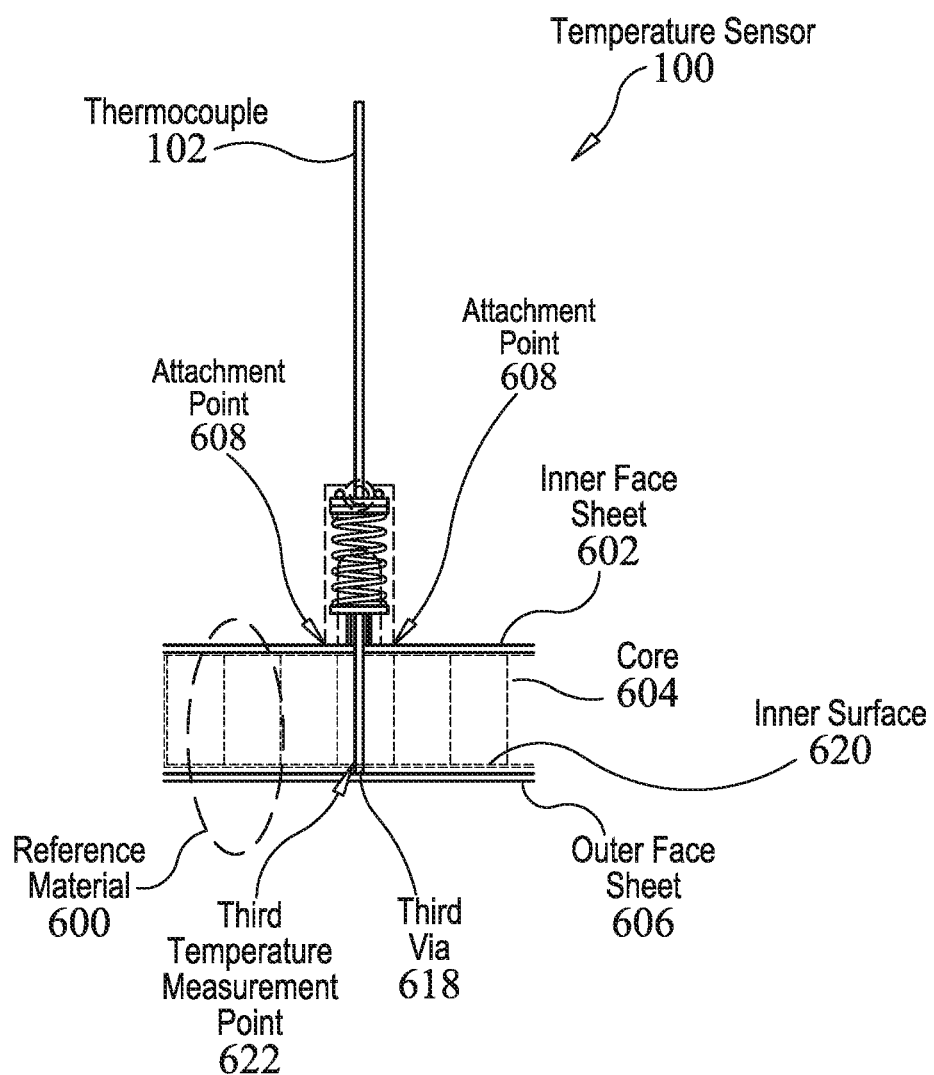
FIG. 6C is a side-view of an example of yet another implementation of the temperature sensor, shown in FIGS. 1, 6A, and 6B, on a reference material in accordance with the present disclosure.

FIG. 6C is a side-view of an example of an implementation of the temperature sensor, shown in FIGS. 1, 6A, and 6B, on a reference material in accordance with the present disclosure. In this example, the reference material 600 includes an even deeper third via 618 that extends through the inner face sheet 602 and the core 604 to an inner surface 620 of the outer face sheet 606. The temperature sensor 100 is attached to the inner face sheet 602 in the same fashion as in the example shown in FIGS. 6A and 6B, however, in this example, the length of the first end 112 of the thermocouple 102 is longer than the example shown in FIGS. 6A and 6B and the first end 112 extends through the inner face sheet 602 and the core 604 to the inner surface 620 via the third via 618. In this configuration, the temperature sensor 100 is configured to measure the temperature of the outer face sheet 606 at a third temperature measurement point 622 at the tip of the thermocouple 102 and inner surface 620 of the outer face sheet 606.

Figure 7:
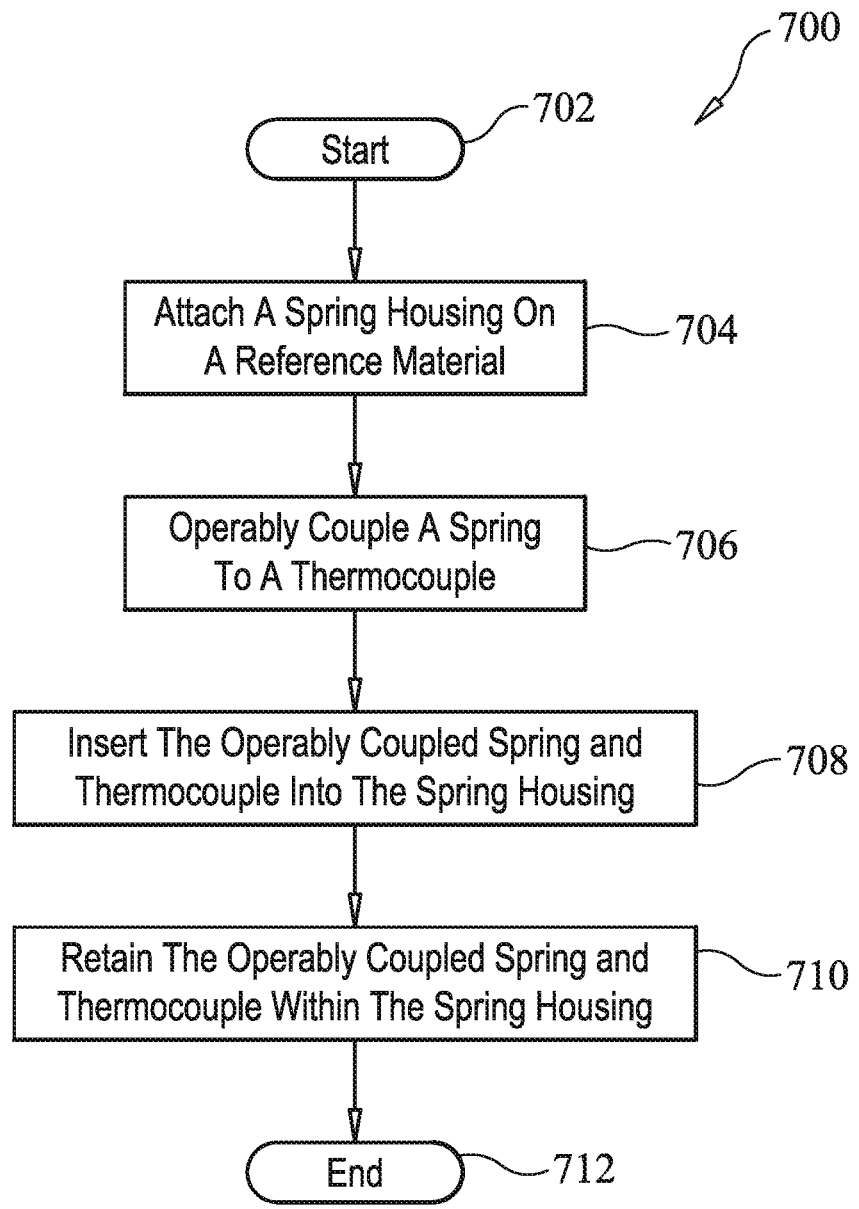
FIG. 7 is a flow diagram of a flowchart illustrating an example of an implementation of a method for installing the temperature sensor on a reference material in accordance with the present disclosure.

FIG. 7 is a flow diagram of a flowchart 700 illustrating an example of an implementation of a method for installing the temperature sensor on a reference material in accordance with the present disclosure. In this example, the method starts 702 by attaching 704 the spring housing 106 on a reference material 108 and then operably coupling 706 the spring 104 to the thermocouple 102. The method then includes inserting 708 the operably coupled spring 104 and thermocouple 102 into the spring housing 106. The method then includes retaining 710 the operably coupled spring 104 and thermocouple 102 within the spring housing 106 at step 710 such that the spring 104 applies a force on the thermocouple 102 in the direction towards the reference material 108. The method then ends 712.

It is appreciated by those of ordinary skill in the art that the sequence order of the steps 704 through 710 may be performed in different orders. As an example, instead of attaching 704 the spring housing on the reference material first, the method may first perform the steps 706 through 710 to form the temperature sensor 100 first before attaching 704 the temperature sensor 100 to the reference material 108.

In this example, operably coupling 706 the spring 104 to the thermocouple 102 may include coupling the thermocouple 102 to the first washer 110 at the border position 118 of the first end 112 and the middle portion 116 of the thermocouple 102 such that the spring 104 applies a force on the first washer 110 in the direction towards the reference material 108.

Additionally, the thermocouple 102 may be coupled to the second washer 120 at the middle portion 116 of the thermocouple 102, such that the spring 104 is coupled to the thermocouple 102 between the first washer 110 and the second washer 120. Furthermore, retaining 710 the operably coupled spring 104 and thermocouple 102 within the spring housing 106 includes operatively attaching the pin 122 to the spring housing 106. Moreover, the pin 122 is configured to retain the second washer 120 within the spring housing 106. Furthermore, inserting 708 the operably coupled spring 104 and thermocouple 102 into the spring housing 106 includes inserting the spacer 124 within the spring housing 106 and the spacer 124 is adjacent to both the spring 104 and the second washer 120 within the spring housing 106 along the middle portion 116 of the thermocouple 102.

Still further, operatively attaching the pin 122 to the spring housing 106 includes attaching the pin 122 to the first end 200 of the spring housing 106 and the spring housing 106 includes the plurality of legs 206 at the second end 202 of the spring housing 106. In this example, attaching 704 the spring housing 106 on the reference material 108 includes attaching the plurality of legs 206 on the inner face sheet 132 of the reference material 108, where attaching the spring housing 106 on the reference material 108 includes welding, soldering, or bonding the spring housing 106 on the reference material 108.

As described earlier, the method may also include a step of drilling the via 138 for the first end 112 of the thermocouple 102 into the reference material 108 and inserting the first end 112 of the thermocouple 102 into the via 138. In this example, the first end 112 is thermally coupled to the inner face sheet 132 or the core 134 and attaching the spring housing 106 on the reference material 108 includes welding, soldering, or bonding the plurality of legs 206 on the inner face sheet 132.

Figure 8:
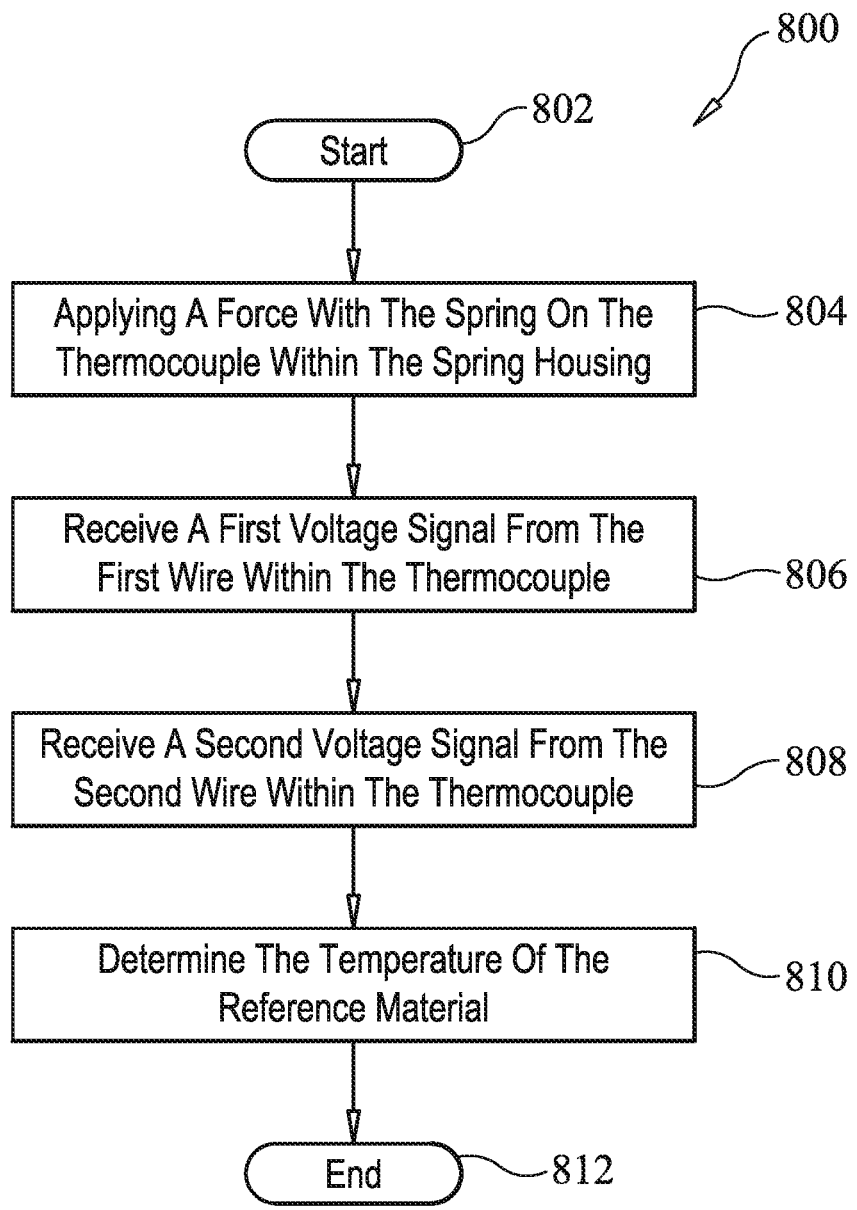
FIG. 8 is a flow diagram of a flowchart illustrating an example of an implementation of a method of operation of the temperature sensor on a reference material in accordance with the present disclosure.

FIG. 8 is a flow diagram of a flowchart 800 illustrating an example of an implementation of a method of operation of the temperature sensor 100 on the reference material 108 in accordance with the present disclosure. The method starts 802 by applying 804 a force with the spring 104 on the thermocouple 102 within the spring housing 106 such that the thermocouple 102 is forced against the surface of the reference material 108 within the spring housing 106. The surface may be inner face sheet 132, core 134, outer face sheet 136, outer surface 140 of the outer face sheet 136, or inner surface 620 of the outer face sheet 606. The temperature sensor 100 then receives 806 a first voltage signal from the first wire 134 within the thermocouple 102 and receives 808 a second voltage signal from a second wire 502 within the thermocouple 102. The controller 126 then determines 810 the temperature of the reference material 108 utilizing the first voltage and second voltage and the method ends 812.

As described earlier, applying 804 the force with the spring 104 on the thermocouple 102 includes applying the force with the spring 104 on a first washer 110 operatively coupled to the thermocouple 102 at a border position 118 of the first end 112 and the middle portion 116 of the thermocouple 102 resulting in the spring 104 applying a force on the first washer 110 in the direction towards the reference material 108.

Additionally, applying 804 the force with the spring 104 on the thermocouple 102 further includes retaining the operably coupled spring 104 and thermocouple 102 within the spring housing 106 such that the spring 104 applies the force on the thermocouple 102 in a direction towards the reference material 108. In this example, retaining the operably coupled spring 104 and thermocouple 102 within the spring housing 106 includes operatively attaching the pin 122 to the spring housing 106 and the pin 122 is configured to retain the second washer 120 within the spring housing 106.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A temperature sensor for measuring a temperature of a reference material, the temperature sensor comprising:
   a thermocouple configured to generate a signal that indicates the temperature of the reference material;
   a spring coupled to the thermocouple;
   a spring housing including a washer; and
   a pin that is configured to retain the washer within the spring housing,
   wherein the spring and the thermocouple are positioned within the spring housing,
   wherein the spring housing is configured to attach to the reference material, and
   wherein the spring is configured to apply a force to the thermocouple in a direction towards the reference material.

2. The temperature sensor of claim 1, further comprising:
   a second washer,
   wherein the thermocouple includes a first end, a second end, and a middle portion between the first end and the second end,
   wherein the thermocouple is coupled to the second washer at a border position of the first end and the middle portion of the thermocouple,
   wherein the spring is further coupled to the middle portion of the thermocouple, and
   wherein the spring is further configured to apply a force to the second washer in the direction towards the reference material.

3. The temperature sensor of claim 2,
   wherein the thermocouple is further coupled to the spring at the middle portion of the thermocouple and adjacent to the second washer at the border position of the first end and the middle portion of the thermocouple,
   wherein the thermocouple is further coupled to the washer at the middle portion of the thermocouple,
   wherein the spring is further coupled to the thermocouple between the washer and the second washer, and
   wherein the pin is coupled to the spring housing.

4. The temperature sensor of claim 3, further comprising a spacer, wherein the spacer is adjacent to the spring and the washer within the spring housing along the middle portion of the thermocouple.

5. The temperature sensor of claim 4, wherein the spring housing includes:
   a pin attachment at a first end of the spring housing; and
   a plurality of legs at a second end of the spring housing.

6. The temperature sensor of claim 1, further including a controller in communication with a second end of the thermocouple.

7. The temperature sensor of claim 1, wherein the thermocouple includes a first wire including a first metal and further includes a second wire including a second metal that is different than the first metal.

8. The temperature sensor of claim 1, wherein the reference material includes an inner face sheet, an outer face sheet, and a core.

9. A method for installing a temperature sensor on a reference material, the method comprising:
   attaching a spring housing on a reference material;
   operably coupling a spring to a thermocouple;
   inserting the operably coupled spring and the thermocouple into the spring housing; and
   retaining the operably coupled spring and the thermocouple within the spring housing using a washer that is included within the spring housing,
   wherein the temperature sensor includes a pin that retains the washer within the spring housing, and
   wherein the spring applies a force to the thermocouple in a direction towards the reference material.

10. The method of claim 9,
    wherein the thermocouple includes a first end, a second end, and a middle portion between the first end and the second end, and
    wherein operably coupling the spring to the thermocouple includes coupling the thermocouple to a second washer at a border position of the first end and the middle portion of the thermocouple, and
    wherein the spring applies a force to the second washer in the direction towards the reference material.

11. The method of claim 10,
wherein the thermocouple is coupled to the washer at the middle portion of the thermocouple, such that the spring is coupled to the thermocouple between the washer and the second washer (120), and
wherein retaining the operably coupled spring and the thermocouple within the spring housing includes operatively attaching the pin.

12. The method of claim 11,
wherein inserting the operably coupled spring and the thermocouple into the spring housing includes inserting a spacer within the spring housing, and
wherein the spacer is adjacent to both the spring and the washer within the spring housing along the middle portion of the thermocouple.

13. The method of claim 12, wherein operatively attaching the pin to the spring housing includes attaching the pin to a first end of the spring housing.

14. The method of claim 13,
wherein the spring housing includes a plurality of legs at a second end of the spring housing, and
wherein attaching the spring housing on the reference material includes attaching the plurality of legs on an inner face sheet of the reference material.

15. The method of claim 14, wherein attaching the spring housing on the reference material includes at least one of welding, soldering, and bonding the spring housing on the reference material.

16. The method of claim 14, further comprising:
drilling a via for the first end of the thermocouple into the reference material; and
inserting the first end of the thermocouple into the via,
wherein the first end is thermally coupled to at least one of an inner face sheet of the reference material and a core of the reference material, and
wherein attaching the spring housing on the reference material includes at least one of welding, soldering, and bonding the plurality of legs on the inner face sheet.

17. A method for measuring a temperature of a reference material utilizing a temperature sensor having a thermocouple, spring, and a spring housing, wherein the spring housing is attached to the reference material, the method comprising:
applying a force with a spring to the thermocouple within the spring housing such that the thermocouple is forced against a surface of the reference material within the spring housing, wherein the spring housing includes a washer, and wherein the temperature sensor includes a pin that retains the washer within the spring housing;
receiving a first voltage signal from a first wire within the thermocouple;
receiving a second voltage signal from a second wire within the thermocouple; and
determining the temperature of the reference material utilizing the first voltage and second voltage.

18. The method of claim 17,
wherein the thermocouple includes a first end, a second end, and a middle portion between the first end and the second end,
wherein applying the force with the spring on the thermocouple includes applying the force with the spring on a second washer operatively coupled to the thermocouple at a border position of the first end and the middle portion of the thermocouple,
wherein the spring applies a force to the second washer in a direction towards the reference material, and
wherein the direction toward the reference material is approximately along a surface normal of the surface.

19. The method of claim 18,
wherein applying the force with the spring on the thermocouple further includes retaining the spring and the thermocouple within the spring housing such that the spring applies the force to the thermocouple in the direction towards the reference material,
wherein the thermocouple is coupled to the washer at the middle portion of the thermocouple,
wherein the spring is coupled to the thermocouple between the washer and the second washer, and
wherein retaining the spring and the thermocouple within the spring housing includes operatively attaching the pin to the spring housing.

20. The method of claim 17, wherein the temperature of the reference material is determined by a controller (126) that is in communication with the thermocouple.

* * * * *

UNITED STATES PATENT AND TRADEMARK OFFICE
CERTIFICATE OF CORRECTION

PATENT NO. : 10,429,248 B2
APPLICATION NO. : 15/456309
DATED : October 1, 2019
INVENTOR(S) : Kuohsing E. Hung and Charles S. Meis Page 1 of 1

It is certified that error appears in the above-identified patent and that said Letters Patent is hereby corrected as shown below:

In the Claims

Claim 11, Column 11, Line 8, change:
"operatively attaching the pin."

To read:
--operatively attaching the pin to the spring housing.--

Signed and Sealed this
Twenty-first Day of July, 2020

Andrei Iancu
*Director of the United States Patent and Trademark Office*